B. CHERNIKEEFF.
SHIP'S LOG.
APPLICATION FILED DEC. 9, 1921.

1,421,405.

Patented July 4, 1922.

Inventor.
Basil Chernikeeff
by
Edward Davis
his Attorney

UNITED STATES PATENT OFFICE.

BASIL CHERNIKEEFF, OF LONDON, ENGLAND.

SHIP'S LOG.

1,421,405.

Specification of Letters Patent.

Patented July 4, 1922.

Application filed December 9, 1921. Serial No. 521,212.

*To all whom it may concern:*

Be it known that I, BASIL CHERNIKEEFF, a Russian citizen, residing at 26 Gledhowe Gardens, Old Brompton Road, South Kensington, London, England, have invented a new and useful Ship's Log, of which the following is a specification.

This invention relates to logs adapted for indicating and recording the speed of and distances travelled by ships.

According to the present invention an opening is made in a vessel at an appropriate distance below the surface of the water, through which opening the improved device is passed into the water and supported at a suitable distance from the vessel. When not in use the device is withdrawn into a closed chamber that surrounds the aforesaid opening on the inside of the vessel.

Hitherto, the submerged element of such apparatus—hereinafter termed the rotator—when adapted for intermittently closing and opening the circuit of an electrical indicating or recording device, has had to be specially constructed to prevent the entry of water. To this end the rotator shaft carrying screw blades has been passed through a bearing into a chamber containing the gears and electric contact mechanism, and this bearing has been provided with a gland packing. Continual adjustment of the packing to maintain a water-tight joint has been found necessary but repeated tightening was found to effect the sensitivity of the rotator by reason of the variation in the resistance to rotation of the shaft. Moreover, a tight packing produces normally more resistance in the bearing than is desirable.

The primary objects of the present invention are therefore to eliminate a tight packing for the rotator shaft and to reduce the variation in frictional resistance of the rotator shaft bearing to a negligible quantity so that the instruments will indicate or record correctly or with negligible errors at all times.

In order to attain this end an unpacked or relatively loose bearing for the rotator shaft is desirable, but such a bearing will admit water—if the rotator chamber is filled with air—especially at such depths as is usual in submarines for example. Further objects of the present invention are therefore to eliminate the air from the rotator chamber and to prevent the entry of water through an unpacked rotator-shaft bearing.

Stated broadly this invention comprises a submerged rotator characterized in that the rotator chamber is filled with lubricant which cannot escape and which prevents the entry of water at all pressures. Stated another way this invention comprises in combination a shaft, a rotator mounted thereon, a casing embracing one end of said shaft, means for electrically controlling a remote indicating and recording device, a lubricant filling for said casing, and means for preventing the escape of said lubricant from said casing. Further features reside in the means for supporting said casing when submerged under water, which comprise radial arms on said casing, a tubular holder mounted on said arms coaxially with the said shaft within said casing, and a tubular stem serving to support said holder submerged in water. Other features relate to the means for controlling the said indicating and recording device and comprise an electrical circuit interrupter within the shaft casing, gearing whereby motion is transmitted from the shaft to said interrupter, and electrical connections between said interrupter and a remote device responsive to electrical impulses.

The invention is illustrated in the accompanying drawings, in which:—

Figure 1:
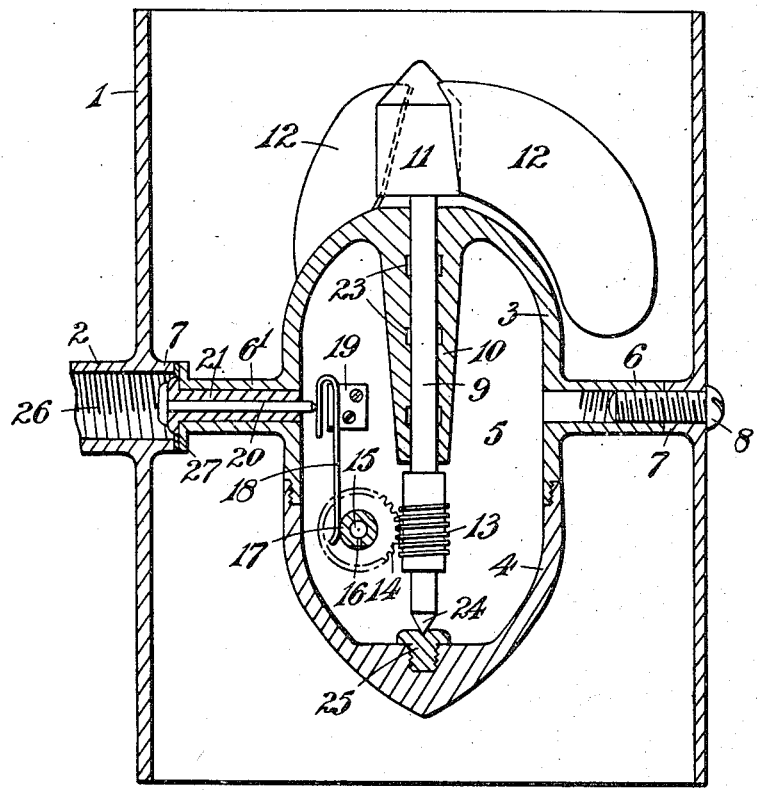
Figure 1 is a longitudinal section partly in elevation.
Figure 2:
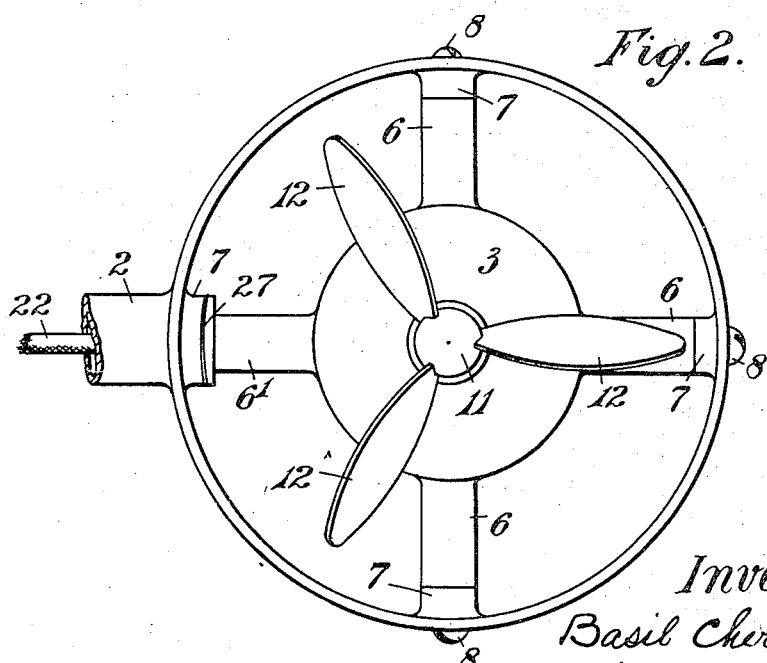
Figure 2 is a front elevation.

Referring to the drawings the device is contained in a cylindrical holder 1 which is open at both ends and is supported transversely by the tubular stem 2 in such a manner that the axis of such holder is parallel with the centre line of the vessel in order that it may disturb the water as little as possible in passing through it. A cylinder 3 having a hemispherical end and a conoidal cap 4 which form a chamber 5, is supported co-axially in the holder 1 by arms 6 engaging bosses 7 and secured by screws 8 for example. The arm $6^1$ also serves as a support but is employed in conjunction with the tubular stem 2 to accommodate an insulated electrical conductor as will be hereinafter described.

The propeller or rotator shaft 9 is loosely mounted in a sleeve bearing 10 and carries a boss 11 at the outer end fitted with blades 12. This shaft, within chamber 5, is provided with a worm 13 that engages a worm wheel 14 mounted on a second shaft or pin 15. The last mentioned shaft or pin carries an electric contact 16 mounted in an insulating disc or drum 17 which when rotated closes an electric circuit through a contact 18 mounted on an insulated support 19 and a pin or contact 20 supported in arm 6¹ by the insulating bush 21 which engages an insulated conductor 22 passing through the hollow stem 2 to the source of energy and electric indicating or recording apparatus located within the vessel. The return circuit is via earth to contact 16.

An electrical impulse takes place in this circuit once in every revolution of disc 17 that is to say once in every predetermined number of revolutions of the rotator shaft.

Chamber 5 is filled with oil or other lubricant either by removing a screw 8 or through any convenient opening in cylinder 3 afterwards plugged as by a screw, and sealed. The clearance between shaft 9 and sleeve 10 is relatively large and permits the air to escape while the oil or lubricant enters the chamber 5. When the chamber is filled and sealed the oil cannot escape as there is no ingress for the water. Similarly, the water cannot enter as there is no outlet for the oil. Sleeve 10 is preferably recessed as at 23 to form seals into which the oil may run or which may be filled with grease.

Since no gland or packing is necessary the amount of friction is considerably reduced and furthermore there is no material variation in the frictional resistance in the sleeve bearing as would be the case if a gland were employed and repeatedly tightened to keep the bearing water-tight. Consequently, the rotator experiences a substantially constant frictional resistance at all times, that is to say, such variation as may take place is negligible from the point of view of disturbing the sensitivity of the apparatus and introducing errors.

The thrust bearing is very small to keep down friction and consists of the conoidal hardened end 24 of shaft 9 engaging in a small hardened cup 25 screwed into the cap 4. The conductor 22 may for example make contact with pin 20 by being screwed into the hollow stem threaded as at 26. Various methods of introducing an electrical connector at this point will however readily suggest themselves to those skilled in the art. The arm 6¹ is preferably flanged as shown and a suitable packing 27 introduced between the flange and the corresponding boss 7 and secured by screws not shewn. All the joints between arms 6 and bosses 7 and the screws 8 are rendered water-tight in any suitable manner.

The device above described is not only suitable for indicating or recording the speed of and distance travelled by a vessel, but is also applicable for measuring the speed or volume or both of water flowing when the device is held stationary, and this application of the device is to be clearly understood as falling within the scope of the appended claims.

I claim:—

1. Mechanism comprising in combination a shaft, a rotator mounted thereon, a casing enclosing one end of said shaft, radial arms on said casing, a tubular holder supported by said arms concentrically with said shaft, a tubular stem serving to support said holder submerged in water, means for electrically controlling a remote indicating and recording instrument and a lubricant filling for said casing.

2. Mechanism comprising in combination a shaft, a rotator mounted thereon, a casing enclosing one end of said shaft, radial arms on said casing, a tubular holder supported by said arms concentrically with said shaft, a water-tight tubular stem serving to support said holder an electrical circuit interrupting device, gearing whereby said shaft actuates said interrupter device, an electrical conductor within said tubular stem serving to connect said interrupting device with a remote indicating and recording instrument and a lubricant filling for said casing.

3. Mechanism comprising in combination a shaft, a rotator mounted thereon, a casing enclosing one end of said shaft, radial arms on said casing, a tubular holder supported by said arms concentrically with said shaft, a water-tight tubular stem serving to support said holder a journal for said shaft in said casing, a thrust bearing for said shaft in said casing, an electrical circuit interrupting device, gearing whereby said shaft actuates said interrupter device, an electrical conductor within said tubular stem, means for connecting said conductor to the interrupting device and to remote indicating and recording instruments and a lubricant filling for said casing.

4. Mechanism comprising in combination a shaft, a rotator mounted thereon, a casing enclosing one end of said shaft, radial arms on said casing, a tubular holder supported by said arms concentrically with said shaft, a water tight tubular stem serving to support said holder, a journaled and a thrust bearing for said shaft in said casing, a worm on said shaft, a worm wheel rotated thereby, a fixed electrical contact, a rotary contact driven by said worm wheel to intermittently engage said fixed contact, an electrical conductor within said tubular stem, means establishing a conductive connection between said fixed contact and said conductor and a lubricant filling for said casing.

BASIL CHERNIKEEFF.